United States Patent [19]
Lee

[11] Patent Number: 5,859,903
[45] Date of Patent: Jan. 12, 1999

[54] METHOD OF DISPLAYING CALLER IDENTIFICATION FOR ABANDONED CALL IN KEY-PHONE SYSTEM

[75] Inventor: Yong-Sang Lee, Seoul, Rep. of Korea

[73] Assignee: SamSung Electronics Co., Ltd., Kyungki-do, Rep. of Korea

[21] Appl. No.: 780,142

[22] Filed: Dec. 26, 1996

[30] Foreign Application Priority Data

Dec. 26, 1995 [KR] Rep. of Korea .................. 1995-56551

[51] Int. Cl.⁶ ............................... H04B 1/00; H04B 1/56
[52] U.S. Cl. ......................... 379/157; 370/142; 370/355
[58] Field of Search .................... 379/111, 112, 379/127, 130, 131, 133, 140, 142, 156, 157, 161, 164, 188, 189, 194, 199, 201, 352, 356, 355, 354, 373, 376

[56] References Cited

U.S. PATENT DOCUMENTS

| | | |
|---|---|---|
| 4,296,282 | 10/1981 | O'Neil et al. . |
| 4,570,035 | 2/1986 | Pinede et al. . |
| 4,924,496 | 5/1990 | Figa et al. ................................. 379/131 |
| 5,265,145 | 11/1993 | Kim . |
| 5,396,548 | 3/1995 | Bayerl et al. ............................ 379/157 |
| 5,398,279 | 3/1995 | Frain . |
| 5,446,785 | 8/1995 | Hirai . |
| 5,452,346 | 9/1995 | Miyamoto . |
| 5,467,385 | 11/1995 | Reuben et al. . |
| 5,479,493 | 12/1995 | Baker et al. ............................ 379/127 |
| 5,546,447 | 8/1996 | Skarbo et al. . |

FOREIGN PATENT DOCUMENTS

| | | |
|---|---|---|
| 2-127846 | 5/1990 | Japan . |
| 2-186894 | 7/1990 | Japan . |
| 6-125392 | 5/1994 | Japan . |

*Primary Examiner*—Paul Loomis
*Attorney, Agent, or Firm*—Robert E. Bushnell, Esq.

[57] ABSTRACT

A caller identification displaying method in a key-phone system includes the steps of generating a ring signal if there is a ring received from an office line, and receiving and registering a caller identification during a pause period of the ring signal, requesting a password if a caller identification key is input, and displaying the registered caller identification information if the input password corresponds to a registered password. Therefore, after receiving and storing a caller identification for an abandoned call for the pause period of a ring signal, when an office line caller gives up a call after a ring is received from an office line, if a subscriber presses a caller identification key for verifying the caller's abandoned number, the caller identification for the abandoned call is displayed. Therefore, it is possible to recognize a telephone number of the caller who abandons his or her call. In addition, the recognized telephone number can be automatically dialed only by pressing the dial key without manually dialing digits of the caller identification.

22 Claims, 5 Drawing Sheets

| TABLE NUMBER | |
|---|---|
| 1 | 701:95.09.05 TUE, 13:20, 05464602831, SAMSUNG |
| 2 | 707:95.09.06 WED, 09:10, 0272272345, KOREA |
| 3 | 701:95.09.06 WED, 10:05, 05464602833, ELECTRON |
| 4 | 702:95.09.06 WED, 15:13, 029758934, YOUNGSANG |
| ... | ... |
| N-1 | |
| N | |

FIG. 4

METHOD OF DISPLAYING CALLER IDENTIFICATION FOR ABANDONED CALL IN KEY-PHONE SYSTEM

CLAIM FOR PRIORITY UNDER 35 U.S.C. §119

This application makes reference to, incorporates the same herein, and claims all benefits accruing under 35 U.S.C. §119 from an application for Method Of Displaying Caller Identification For Abandoned Call In Key-Phone System earlier filed in the Korean Industrial Property Office on the 26th of Dec. 1995, and there duly assigned Ser. No. 56551/1995.

BACKGROUND OF THE INVENTION

1. Technical Field

The present invention relates to telephone keyphone circuits and processes generally, and more particularly, to circuits and processes for displaying a caller identification for an abandoned call in an exchange system, as well as to circuits and processes for displaying a caller identification on a display device in case when a caller from an office line hangs up the call since there is no response after receiving and storing the caller identification when a ring is received in a key-phone system.

2. Background Art

Generally, a key phone system includes a plurality of telephone stations and a central key service unit (KSU) which interconnects the telephones with each other and to a selected one of a plurality of central office lines. The KSU provides control functions for the key-phone system and establishes communication paths between telephone stations. Each telephone station is provided with a hold button and a plurality of sets of central office lamps and buttons, each set corresponding on a one-to-one basis to the central office lines. The central office lamps allow the subscriber or user to visualize the status of each individual central office line. A central office lamp turns off while the central office line is idle, turns on while the central office line is in use, flashes slowly while the central office line is being held, and flashes rapidly while an incoming call is being received over the central office line. The central office buttons are available for selecting and seizing any of the central office lines. The KSU detects an operation of the central office buttons which may occur at any telephone set so as to connect the telephone station to the selected central office line. Examples of such a key telephone system are disclosed in U.S. Pat. No. 4,570,035 for Programmable Key Telephone System issued to Pinede et al., U.S. Pat. No. 4,682,353 for Key Telephone System issued to Inoue et al., and U.S. Pat. No. 5,513,256 for Key Telephone System issued to Komuro.

Depending upon its sophistication and complexity, a key phone system can provide a wide variety of system features. One notable feature is to display a message from a caller or a name of the caller when the subscriber is absent to response to the call as disclosed, for example, in Japanese Laid-Open No. 2-186894 for Key Telephone System issued to Hiyama, and Japanese Laid-Open No. 2- 127846 for Key Telephone System issued to Okamoto. Caller identification information which is commonly available for conventional telephone system may also be adapted for key phone systems when the user is subscribed to the caller identification service. In a typical telephone system, the caller identification information is added to the ring signal at a telephone exchange system as a service. Thereafter, the telephone number of the caller is displayed on a telephone set of the subscriber after the telephone number information is decoded to the telephone number of the caller. As a result, the subscriber can identify the caller before the subscriber picks up a handset of the telephone system to answer the call. Exemplary telephone systems with caller identification are disclosed in U.S. Pat. No. 5,365,145 for Alphanumeric Caller Identification Telephone issued to Lim, U.S. Pat. No. 5,398,279 for Telephone Apparatus With Calling Line Identification issued to Frain, U.S. Pat. No. 5,446,785 for Telephone Terminal Equipment In Which Telephone Numbers Of Callers Are Displayed issued to Hirai, U.S. Pat. No. 5,452,346 for Telephone Apparatus With Caller Identification issued to Miyamoto, and U.S. Pat. No. 5,467,385 for Calling Number Display And Recording System issued to Reuben et al.

When the key phone system is subscribed to the caller identification service, however, the caller identification information is typically displayed on a display unit of a key phone terminal only while a ring is received in the key phone system. The caller identification information is not displayed on the display unit of the key phone terminal after the caller abandons his or her call for any reasons including when there is no answer from the subscriber. If the caller abandons or hangs up the call, as I have observed, the key phone system including a KSU and a plurality of extension line subscriber terminals is not equipped to allow the subscriber to verify the identity of the caller who quickly abandons his or her call primarily because of the complexity and difficulty of coordinating communications between the KSU and the extension line subscriber terminals.

SUMMARY OF THE INVENTION

Accordingly, it is therefore an object of the present invention to provide an improved key phone system.

It is also an object to provide an improved key phone system with caller identification.

It is another object to provide an improved key phone system capable of providing a visual display of caller identification information even when the caller abandons his or her call.

It is yet another object to provide a key phone system capable of maintaining a history of caller identification information.

These and other objects of the present invention can be achieved by a caller identification display method in a key phone system having a key service unit and a plurality of extension line subscriber terminals which includes the steps of generating a ring signal if there is a ring received from an office line, registering caller identification information during a pause period of the ring signal; requesting a password from a subscriber if a caller identification key is input from a designated extension line subscriber terminal, and providing a visual display of the registered caller identification information on the designated extension line subscriber terminal if the input password corresponds to a registered password.

A key phone system as contemplated by the present invention may be constructed with a key service unit having a plurality of first ports coupled to a plurality of office lines and a plurality of second ports coupled to a plurality of extension line subscriber terminals, each terminal including a handset, a display unit for providing a visual display of caller identification information, a plurality of discrete function keys including a clear key, a scroll key, a dial key, volume-up and volume-down keys, a caller identification key and an end key, and a plurality of alphanumeric keys for inputting a telephone number. The key service unit includes a memory for storing said caller identification information, and a controller for controlling registration of caller identification information of each incoming call by: sending a ring signal to a designated extension line subscriber terminal in response to reception of an incoming call from an office line; registering caller identification information included in the ring signal during a pause period of the ring signal, in the memory; after the caller identification information is registered in the memory, requesting a password from a subscriber from the designed extension line subscriber terminal for access to the caller identification information registered in the memory, when the caller identification key is depressed by the subscriber from the designated extension line subscriber terminal; and when the password input from the designated extension line subscriber terminal is accepted by the key service unit, providing a visual display of registered caller identification information on the display unit of the designated extension line subscriber terminal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 4 illustrates a table of a caller identification abandoned buffer according to the principles of the present invention.

DETAILED DESCRIPTION OF THE PREFERRED EMBODIMENT

Figure 1:
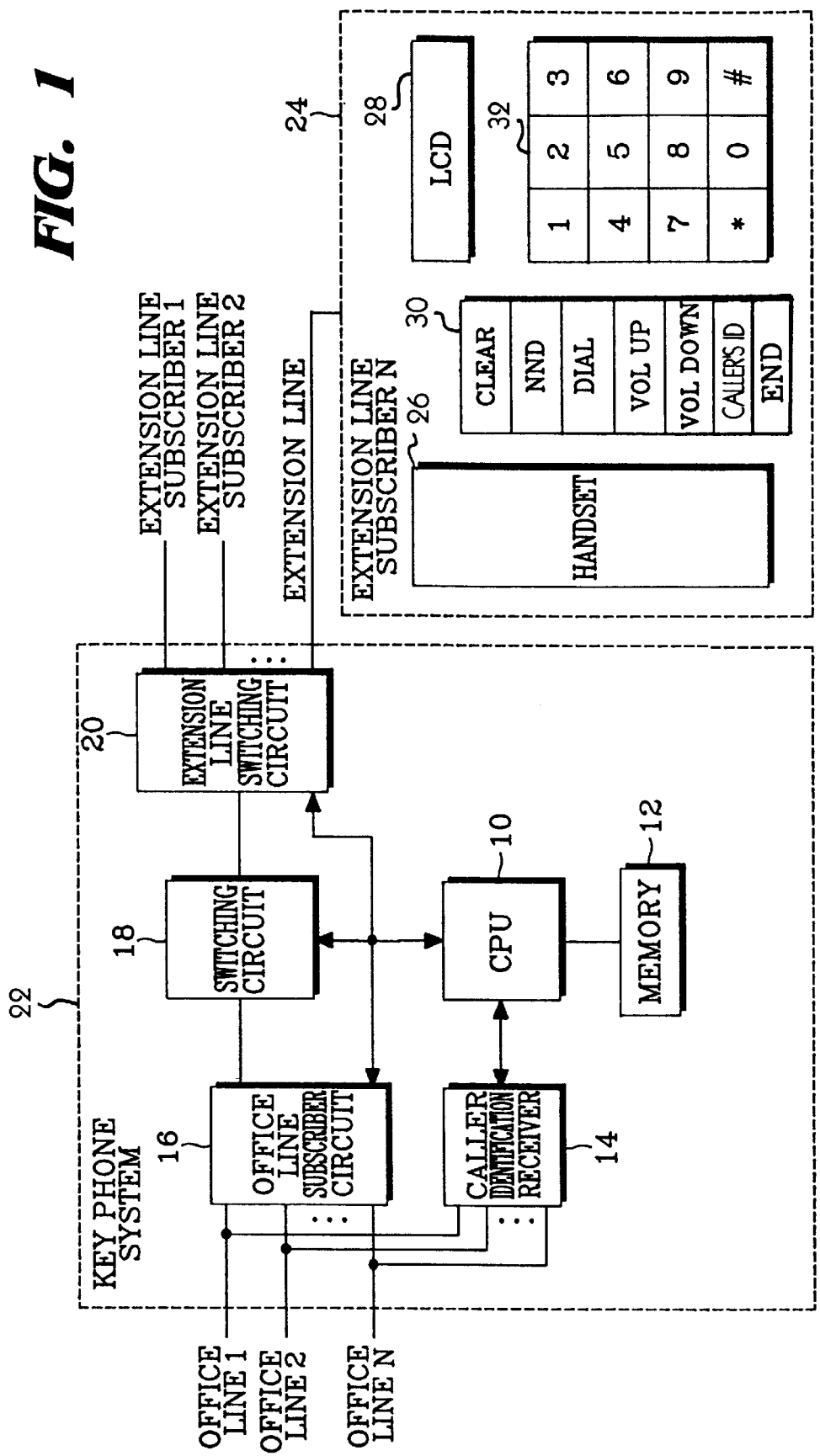
FIG. 1 is a block diagram of a key phone system constructed according to the principles of the present invention.

Referring now to the drawings and particularly to FIG. 1, which illustrates a key phone system constructed according to the principles of the present invention. Caller identification data (ID) as contemplated by the present invention includes a caller's telephone number, a caller's name, a call type, or calling time, as indicated in following Table 1, and is transmitted from a telephone exchange system for a pause period between ring signals.

TABLE 1

| Line | Data | Time | Phone number | Name |
|------|------|------|--------------|------|
| #1 | Jun. 05 | 11:15 PM | 321-7654 | Lee Jung sung |
| #3 | Oct. 15 | 10:03 AM | 460-2833 | Park Su Bang |
| #9 | Set. 12 | 09:10 PM | 524-3333 | Kim Min Ho |

As shown in FIG. 1, the key phone system includes a central key service unit (KSU) 22 connected to a plurality of central office lines, and a plurality of extension line subscriber terminals representing telephone stations 24 connected to the KSU 22 through a plurality of extension lines. The KSU 22 comprises a central processing unit (CPU) 10 for controlling overall operations of the key phone system, including a caller identification data path to be formed in response to the detection of caller identification data (ID) contained in a ring signal, and the caller identification data to be displayed by analyzing caller ID information. A memory 12 includes a table for storing received caller identification information designated for each respective extension line subscriber terminals, and a program of an initial service data for performing a call function and other various functions. An office line subscriber circuit 16 detects a ring signal applied from a plurality of office line 1-n, seizes the corresponding office line under control of the CPU 10 to form an office line loop, and interfaces an incoming signal from an office line. A caller identification receiver 14 receives and outputs caller identification which is asynchronous serial data additively having a start bit and a stop bit for the pause period of the ring signal under control of the CPU 10 when the ring signal received from the office line is detected. A switching circuit 18 switches various tones and data under control of the CPU 10. An extension line subscriber circuit 20 supplies communication current of a voice band to an extension subscriber's key-phone set and a general telephone, and interfaces between the extension line telephone and equipment. The extension line subscriber circuit 20 is connected to a plurality of extension line subscriber terminals 1, 2, . . . N.

Each extension line subscriber terminal 24 includes a handset 26, a liquid crystal display (LCD) 28 for providing a visual display of the caller identification information, a plurality of discrete function keys 28 including a clear key, a NND key, a dial key, volume-up and volume-down keys, a caller's ID key, and a caller's ID end key, and a plurality of alphanumeric keys 32 for inputting a telephone number. When there is a call, the extension line subscriber terminal having a function of receiving a caller's ID signal supplied from the telephone exchange system verifies the caller identification, and displays the caller identification information on the LCD 28 so that the subscriber can later verify the identity of the caller who abandons his or her call.

Figure 2:
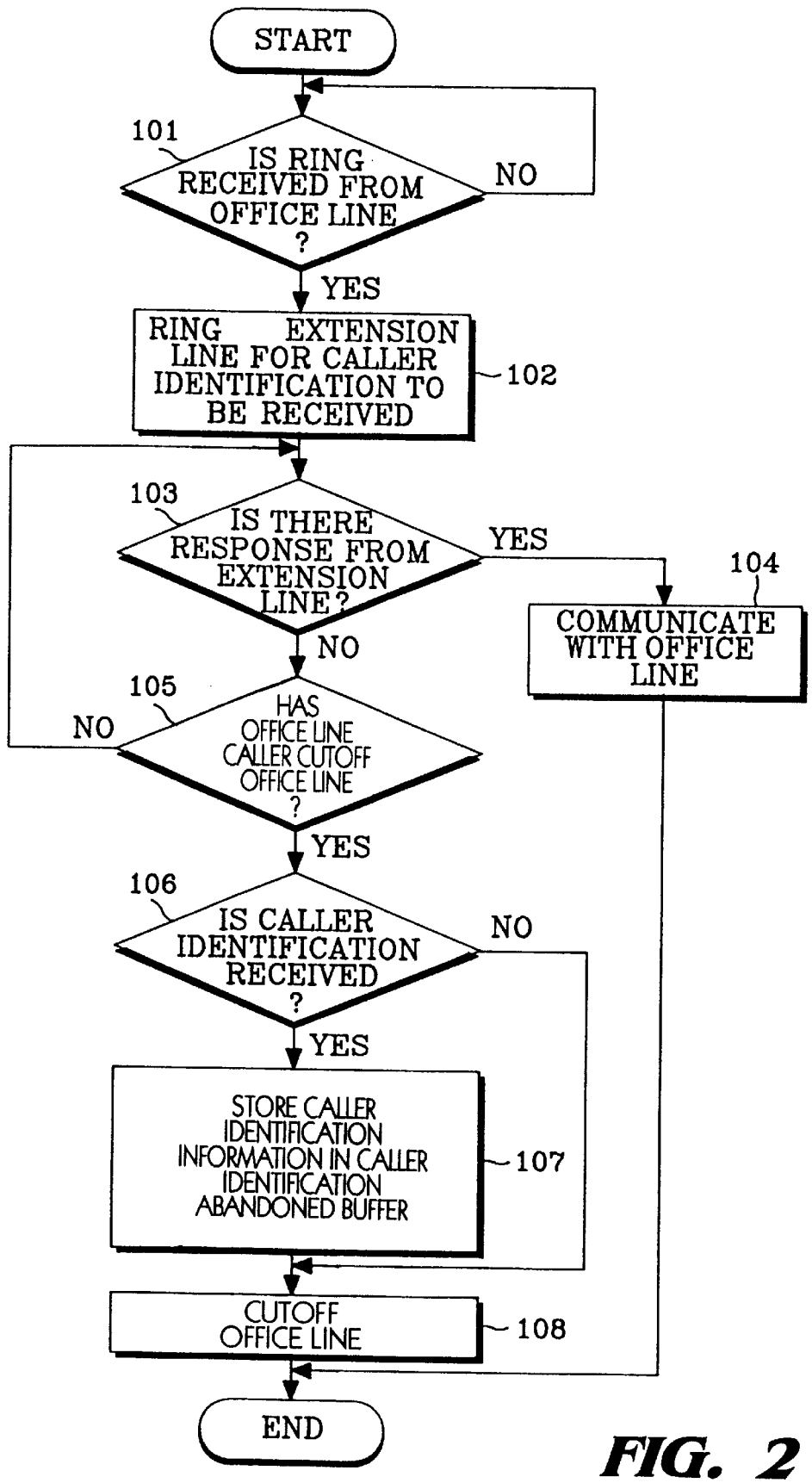
FIG. 2 illustrates a process of registering caller identification information in a memory even when a caller hangs up a call after a ring is received from an office line according to the principles of the present invention.
Figure 3A:
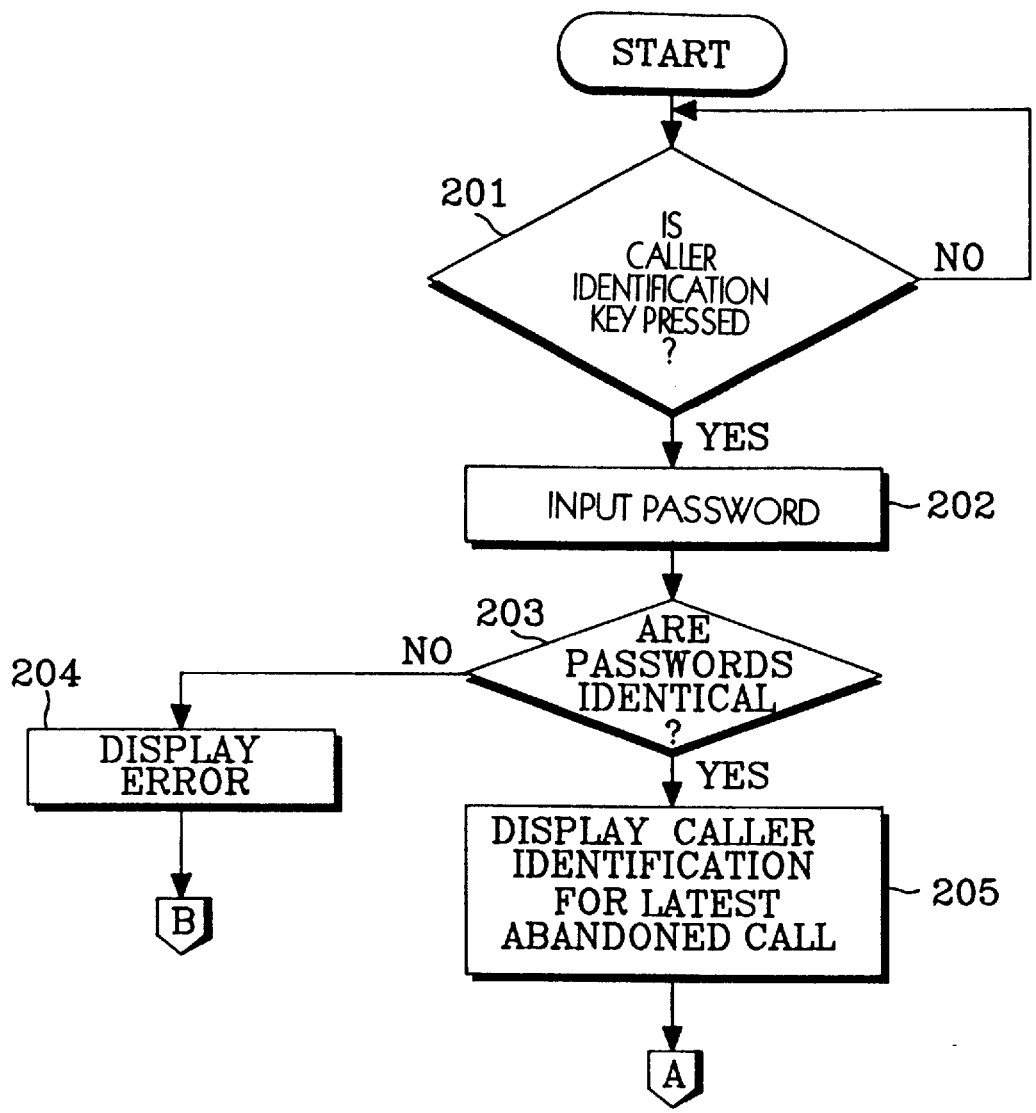
FIGS. 3A and 3B illustrate a process of displaying and dialing a caller's phone number contained in the caller identification information as registered in the memory according to the principles of the present invention.
Figure 3B:
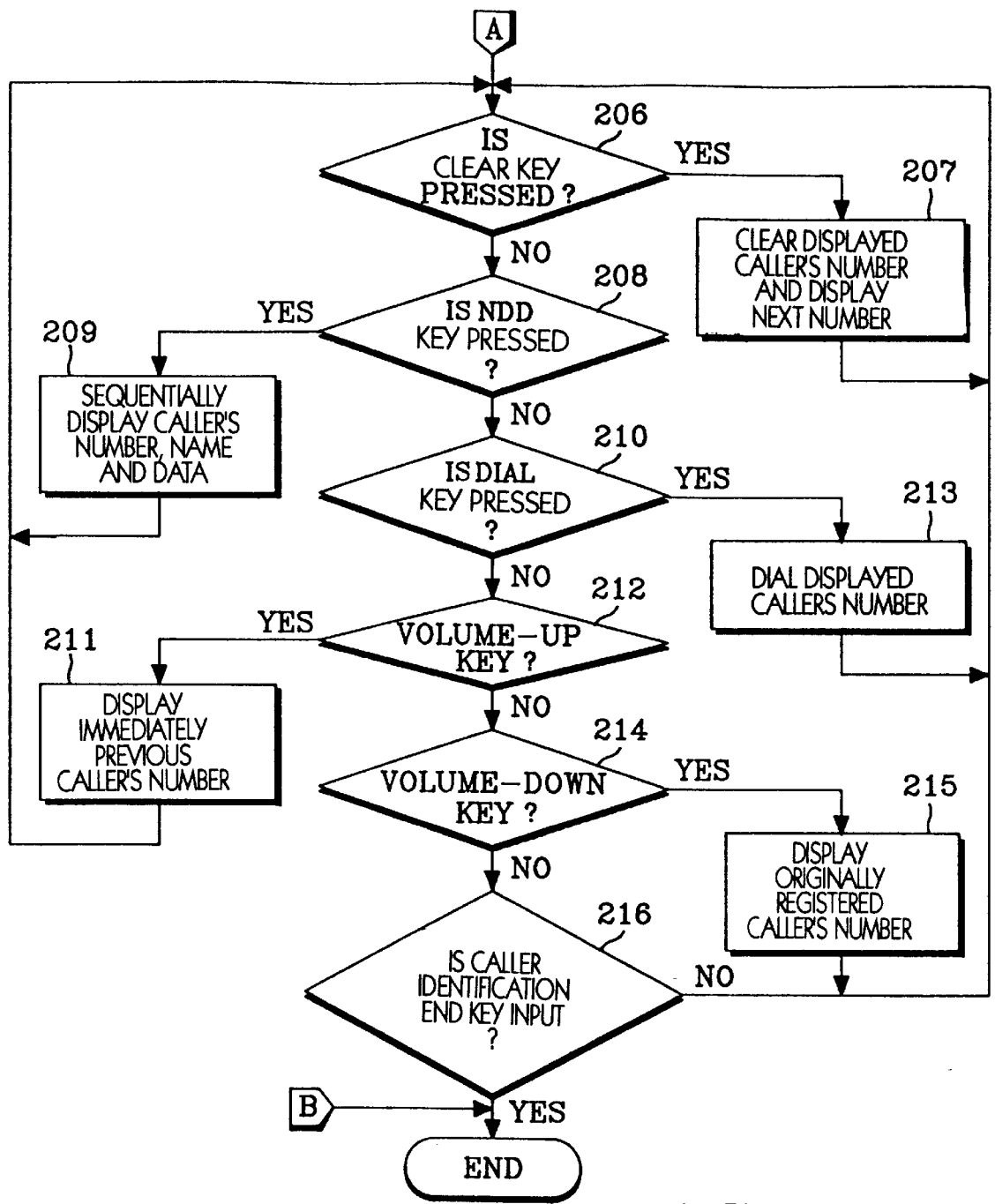

Turning now to FIG. 2 which illustrates a process of registering caller identification information in a memory even when a caller hangs up a call after a ring is received from an office line is according to the principles of the present invention, FIGS. 3A and 3B which illustrate a process of displaying and dialing a caller's phone number contained in the caller identification information as registered in the memory according to FIG. 2, and FIG. 4 which illustrates a table of a caller identification abandoned buffer contained in the memory according to the principles of the present invention. The operation of a preferred embodiment of the present invention will be described in detail with reference to FIGS. 1 through 3B.

First, the operation of receiving and registering a caller's phone number when a ring is received from an office line will be described with reference to FIGS. 1, 2 and 4. In step 101, the CPU 10 determines whether a ring is received from an office line via the office line subscriber circuit 16. When there is a ring from the office line, the CPU 10 sends the ring to a desired extension line subscriber terminal for caller identification information to be ultimately received at step 102. During this step, the CPU 10 also receives the caller identification information contained in a pause period of the ring signal from the caller identification receiver 14 and stores the same in a temporary buffer. Thereafter, in step 103, the CPU 10 checks whether there is a response for the call from the extension line subscriber terminal 24, and proceeds to step 104 to form a communication path between the office line and extension line subscriber terminal 24 if there is a response from the extension line subscriber terminal 24. If there is no response from the extension line subscriber terminal 24 for a predetermined time period at step 104, however, the CPU 10 proceeds to step 105 to determine whether the office line caller hangs up the phone or cuts off the office line. If the office line caller does not hang up the phone, the CPU 10 returns to step 103. If the office line caller hangs up the phone, however, the CPU 10 proceeds to step 106 to determine whether the caller identification information is received from the office line. If the caller identification is not received, the CPU 10 controls the office line subscriber circuit 16 to cut off the office line at step 108. However, if the office line caller identification is received at step 106, the CPU 10 proceeds to step 107 to sequentially store the caller identification received and stored in the temporary buffer in a caller identification abandoned buffer having a table structure contained in memory 12 as shown in FIG. 4. Then, the CPU 10 controls the office line subscriber circuit 16 to cut off the office line at step 108. As contemplated by the present invention, the caller identification abandoned buffer is preferably constructed using a First-In-First-Out (FIFO) method. Thus, when the buffer is completely filled, if information is received, the oldest information is cleared and the remaining information is stored.

Now, the operation of displaying and dialing the registered caller's phone number after registering the abandoned caller's phone number, will be described with reference to FIGS. 1, 3A and 3B. In step 201, the CPU 10 checks whether a caller's ID key is pressed by the subscriber from the extension line subscriber terminal 24. When the caller's ID key is pressed from the extension line subscriber terminal 24, the CPU 10 generates a message requesting the input of a password, and controls the extension line subscriber circuit 20 to display the message on a LCD of the extension line subscriber terminal 24. At this time, a secret number is input from the extension line subscriber terminal 24. Then, in step 203, the CPU 10 checks whether the input password is identical with an internally stored password, and proceeds to step 204 to display an error on the LCD of the extension line subscriber terminals 24 through the extension line subscriber circuit 20 if the input password from the extension line subscriber terminal is not identical with the internally stored password. However, if the passwords are identical at step 205, the CPU 10 proceeds to step 205 to read the caller identification for the latest abandoned call from the caller identification abandoned buffer to then provide a visual display of the same on the LCD of the extension line subscriber terminal 24 through the extension line subscriber circuit 20. For example, if the number of the latest abandoned call is 029758934, this number will be displayed on the LCD of the extension line subscriber terminal 24.

Here, the CPU 10 may be configured to proceed directly to step 205 without requiring the subscriber to input the password after the caller's ID key is pressed at step 201. This is so that the caller identification for the latest abandoned call can be displayed on the LCD of the extension line subscriber terminal 24 with ease. In such a state where the caller identification is displayed, the CPU 10 proceeds to step 206 to determine whether a clear key is pressed from the extension line subscriber terminal 24. If the clear key is pressed from the extension line subscriber terminal 24, the CPU 10 proceeds to step 207 to clear the caller identification that is currently being displayed on the LCD of the extension line subscriber terminal 24, and to read the next caller identification, e.g., 05464602833, to be displayed on the LCD of the extension line subscriber terminals 24 through the extension line subscriber circuit 20, and then return to step 206. If the clear button is not pressed at step 206, the CPU 10 checks whether a NND key is pressed from the extension line subscriber terminal 24. If the NND button is pressed from the extension line subscriber terminal 24, the CPU 10 proceeds to step 209 to read the caller identification, name or date that is registered in the caller identification abandon buffer to be displayed cyclically on the LCD of the extension line subscriber terminals 24 through the extension line subscriber circuit 20, to then return to step 206. For example, the caller identification "029758934" is displayed on the LCD, the next caller's name "Yongsang" is displayed thereon and then the next calling date "09/06, 15:13, 702" is displayed. However, if the NND button is not pressed, the CPU 10 proceeds to step 210 so that the CPU 10 checks whether a dial button (DIAL) is pressed from the extension line subscriber terminal 24. If the dial button is pressed, the CPU 10 proceeds to step 213 so that the CPU 10 controls the office line subscriber circuit 16 to form an office line communication loop to then perform dialing to the currently displayed caller identification to allow communication and then return to step 206.

In step 210, if the dial button is not pressed from the extension line subscriber terminal 24, the CPU 10 proceeds to step 212 to determine whether a volume-up key (VOL UP) is pressed from the extension line subscriber terminal 24. If the volume-up key is pressed from the extension line subscriber terminal 24, the CPU 10 proceeds to step 211 to read the caller identification registered immediately before the currently displayed caller identification, e.g., 05464602833, to then be displayed on the LCD of the extension line subscriber terminal 24 through the extension line subscriber circuit 20, and then returns to step 206. However, if the volume-up key is not pressed from the extension line subscriber terminal 24 at step 212, the CPU 10 proceeds to step 214 to determine whether a volume-down key (VOL DOWN) is pressed from the extension line subscriber terminal 24. At this time, if the volume-down key is pressed from the extension line subscriber terminal 24, the CPU 10 proceeds to step 215 to read the originally registered caller identification, is e.g., 05464602831, to then be displayed on the LCD of the extension line subscriber terminals 24 through the extension line subscriber circuit 20, and then returns to step 206. Thereafter, if the volume down key is not pressed at step 214, step 216 is proceeded. And then in step 216, the CPU 10 checks whether a caller's ID end key is input. If caller's ID end key is not input, the CPU 10 returns to step 206 to iteratively perform the aforementioned operations. If the caller's ID end key is input, the CPU 10 terminates the program to enter an idle state.

As described above, according to the present invention, the caller identification information of an abandoned call received during the pause period of a ring signal is stored in a caller identification abandoned buffer each time an office line caller gives up a call after a ring is received from an office line. Once stored, if the subscriber presses a caller identification key for verifying the caller's abandoned number, the caller identification for the abandoned call is displayed. Therefore, it is possible to recognize the phone number even the user's absence. Also, the recognized phone number can be automatically dialed only by pressing the dial key without manually dialing digits of the caller identification. While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A caller identification display method in a key phone system including a key service unit and a plurality of extension line subscriber terminals, said method comprising the steps of:

generating a ring signal from said key service unit to a designated extension line subscriber terminal in response to reception of an incoming call from an office line;

registering caller identification information contained in said ring signal during a pause period of said ring signal, in a memory;

after said caller identification information is registered in said memory, requesting a password from a subscriber from the designed extension line subscriber terminal for access to said caller identification information registered in said memory, when a caller identification key is input from the designated extension line subscriber terminal; and when the password input from the designated extension line subscriber terminal is accepted by said key service unit, providing a visual display of registered caller identification information on the designated extension line subscriber terminal.

2. The caller identification display method of claim 1, further comprised of said caller identification information including a caller's name, a caller's telephone number, time, and date of said incoming call.

3. The caller identification display method of claim 2, further comprised of said designated extension line subscriber terminal comprising:

a handset;

a display unit for providing a visual display of the caller identification information;

a plurality of discrete function keys including a clear key, a scroll key, a dial key, volume-up and volume-down keys, a caller identification key, and an end key; and a plurality of alphanumeric keys for inputting a telephone number.

4. The caller identification display method of claim 3, further clearing currently displayed caller identification information and displaying caller identification information immediately before finally registered caller identification information on said display unit of the designated extension line subscriber terminal, when said clear key is input after displaying said currently displayed caller identification information on said display unit of the designated extension line subscriber terminal.

5. The caller identification display method of claim 4, further cyclically displaying currently displayed caller identification information in terms of said caller's name, said caller's telephone number, time and date of said incoming call on said display unit, in response to depression of said scroll key.

6. The caller identification display method of claim 4, further dialing a currently displayed caller's telephone number included in said currently displayed caller identification information, in response to depression of said dial key.

7. The caller identification display method of claim 6, further:

displaying caller identification information registered immediately before currently displayed caller identification information, in response to input of said volume-up key after displaying said caller identification information; and displaying originally registered caller identification information, in response to input of said volume-down key after displaying said caller identification information.

8. The caller identification display method of claim 1, further comprised of said caller identification information being registered in said memory by:

storing said caller identification information during the pause period of said ring signal in a temporary buffer; and when a caller terminates the incoming call, sequentially storing the caller identification information stored in said temporary buffer in a predetermined region of a caller identification abandoned buffer contained in said memory.

9. A caller identification display method in a key phone system including a key service unit and a plurality of extension line subscriber terminals, said method comprising the steps of:

generating a ring signal from said key service unit to a designated extension line subscriber terminal in response to reception of an incoming call from an office line;

storing caller identification information contained in said incoming call during a pause period of said ring signal, in a temporary buffer;

sequentially registering the caller identification information stored in said temporary buffer in a predetermined region of a caller identification abandon buffer, when an office line caller terminates said incoming call; and providing a visual display of registered caller identification information on the designated extension line subscriber terminal, in response to depression of a caller identification key.

10. The caller identification display method of claim 9, further comprised of said caller identification information including a caller's name, a caller's telephone number, time, and date of said incoming call.

11. The caller identification display method of claim 10, further comprised of said designated extension line subscriber terminal comprising:

a handset;

a display unit for providing a visual display of the caller identification information;

a plurality of discrete function keys including a clear key, a scroll key, a dial key, volume-up and volume-down keys, said caller identification key, and an end key; and a plurality of alphanumeric keys for inputting a telephone number.

12. The caller identification display method of claim 11, further clearing currently displayed caller identification information and displaying caller identification information immediately before finally registered caller identification information on said display unit of the designated extension line subscriber terminal, when said clear key is input after displaying said currently displayed caller identification information on said display unit of the designated extension line subscriber terminal.

13. The caller identification display method of claim 12, further cyclically displaying currently displayed caller identification information in terms of said caller's name, said caller's telephone number, time and date of said incoming call on said display unit, in response to depression of said scroll key.

14. The caller identification display method of claim 13, further dialing a currently displayed caller's telephone number included in said currently displayed caller identification information, in response to depression of said dial key.

15. The caller identification display method of claim 14, further:

displaying caller identification information registered immediately before currently displayed caller identification information, in response to input of said volume-up key after displaying said caller identification information; and displaying originally registered caller identification information, in response to input of said volume-down key after displaying said caller identification information.

16. A key phone system, comprising:

a key service unit having a plurality of first ports coupled to a plurality of office lines and a plurality of second ports coupled to a plurality of extension line subscriber terminals, each terminal including a handset, a display unit for providing a visual display of caller identification information, a plurality of discrete function keys including a clear key, a scroll key, a dial key, volume-up and volume-down keys, a caller identification key and an end key, and a plurality of alphanumeric keys for inputting a telephone number; and said key service unit including a memory for storing said caller identification information, and a controller for controlling registration of caller identification information of each incoming call by:

sending a ring signal to a designated extension line subscriber terminal in response to reception of an incoming call from an office line;

registering caller identification information included in said ring signal during a pause period of said ring signal, in said memory;

after said caller identification information is registered in said memory, requesting a password from a subscriber from the designated extension line subscriber terminal for access to said caller identification information registered in said memory, when said caller identification key is depressed by the subscriber from the designated extension line subscriber terminal; and when the password input from the designated extension line subscriber terminal is accepted by said key service unit, providing a visual display of registered caller identification information on the display unit of the designated extension line subscriber terminal.

17. The key phone system of claim 15, further comprised of said caller identification information including a caller's name, a caller's telephone number, time, and date of said incoming call.

18. The key phone system of claim 16, further comprised of said controller clearing currently displayed caller identification information and providing a visual display of caller identification information immediately before finally registered caller identification information on said display unit of the designated extension line subscriber terminal, when said clear key is input by the subscriber after displaying said currently displayed caller identification information on said display unit of the designated extension line subscriber terminal.

19. The key phone system of claim 18, further comprised of said controller cyclically providing a visual display of currently displayed caller identification information in terms of said caller's name, said caller's telephone number, time and date of said incoming call on said display unit, in response to depression of said scroll key.

20. The key phone system of claim 18, further comprised of said controller dialing a currently displayed caller's telephone number included in said currently displayed caller identification information, in response to depression of said dial key.

21. The key phone system of claim 19, further comprised of said controller:

displaying caller identification information registered immediately before currently displayed caller identification information, in response to input of said volume-up key after displaying said caller identification information; and displaying originally registered caller identification information, in response to input of said volume-down key after displaying said caller identification information.

22. The key phone system of claim 18, further comprised of said controller registering said caller identification information in said memory by:

storing said caller identification information during the pause period of said ring signal in a temporary buffer; and when a caller terminates the incoming call, sequentially storing the caller identification information stored in said temporary buffer in a predetermined region of a caller identification abandoned buffer contained in said memory.

* * * * *